Jan. 5, 1965 A. D. OLIVER 3,164,163

VALVE CONSTRUCTION

Filed April 25, 1962 2 Sheets-Sheet 1

INVENTOR.
Alton D. Oliver
BY
ATTORNEYS

Jan. 5, 1965  A. D. OLIVER  3,164,163
VALVE CONSTRUCTION
Filed April 25, 1962  2 Sheets-Sheet 2

INVENTOR.
Alton D. Oliver
BY
Flehr and Swain
ATTORNEYS 3,164,163
VALVE CONSTRUCTION
Alton D. Oliver, Houston, Tex., assignor to M & J
Engineering Co., Houston, Tex., a partnership
Filed Apr. 25, 1962, Ser. No. 190,147
4 Claims. (Cl. 137—315)

This invention relates generally to valves of the gate type for controlling fluid flow.

An object of the present invention is to provide a gate valve characterized by the use of a gate formed of two separate portions removably connected together and in which the body construction is such that the two portions of the gate can be assembled and disassembled through at least one of the openings in the side walls and characterized by novel means for releasably securing the two portions of the gate together.

Another object of the invention is to provide an improved gate valve construction of the above character which can be readily manufactured, and which facilitates assembly and disassembly operations.

Additional objects and features of the invention will appear from the following description in which the preferred embodiment has been set forth in detail in conjunction with the accompanying drawing.

Referring to the drawing.

Figure 1:
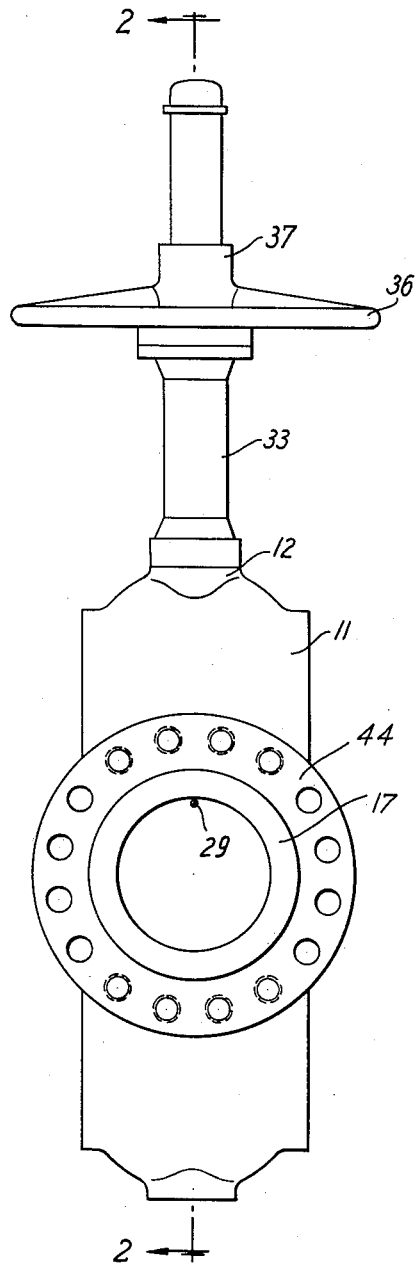
FIGURE 1 is an end view in elevation, illustrating a valve in accordance with the present invention.
Figure 2:
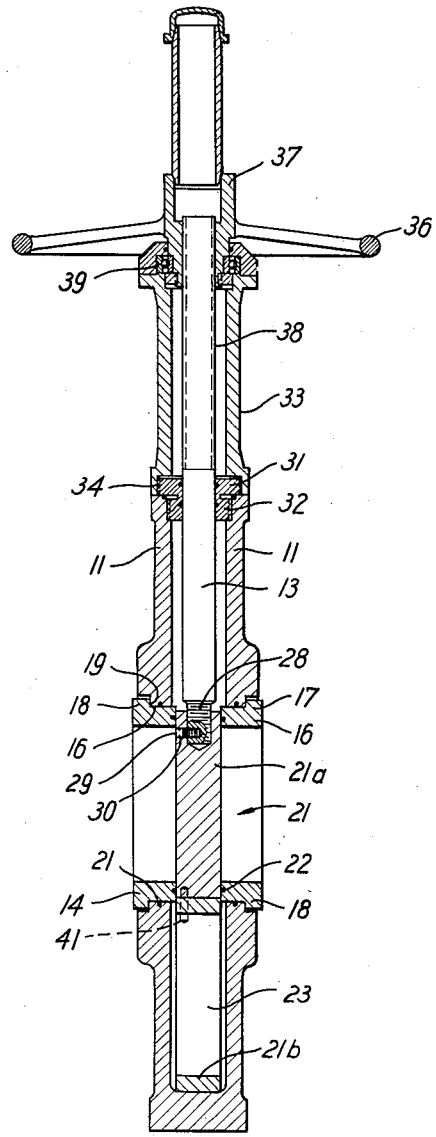
FIGURE 2 is a cross section taken along the line 2—2 of FIGURE 1.

The valve illustrated in FIGURES 1 and 2 consists of a body part which in this instance is formed as a casting, and which is made of suitable metals such as cast iron, semi-steel, or steel, depending upon working pressure requirements. Instead of a body made of cast material, it is possible to use a body fabricated from structural steel members, such as steel plate and the like. The side walls 11 are relatively flat and at one end the body is provided with reduced neck portion 12, which has an inner opening to accommodate the operating stem 13.

The side walls are provided with the aligned openings 16, which accommodate the metal seat rings 17. These rings can be provided with enlarged portions or flanges 18, which normally contact and seat against the shoulders 19 formed on the side walls 11. Suitable means, such as seal rings 21 of the resilient O-ring type, can be provided to prevent leakage between the body and the seat rings.

The valve gate indicated generally at 21 consists of two separable portions 21a and 21b. The portion 21a can be formed from a flat metal plate, such as mill rolled steel, and may have a circular configuration. It has an outer diameter slightly less than the diameter of the opening 16, and its opposite sides are adapted to seat upon the inner opposed end faces of the seat rings 17. The inner opposed end portions of the seat rings can be provided with seal rings 22 of the resilient type, which provide sealing contact with the gate surfaces.

The gate portion 21b is in the form of an annulus or ring having an outer diameter corresponding to the diameter of the portion 21a, and an inner opening 23 of a diameter corresponding to the diameter of the flow passages through the seat rings 17. The two gate portions 21a and 21b are releasably attached together by means presently to be described.

For closed position of the gate, the margin of gate portion 21a makes sealing contact with the resilient insert seals 22. When the gate is moved from closed to full open position the opening 23 in gate portion 21b register with the flow passages through the seats 17, with the side faces of gate portion 21b engaging the seal rings 22. The operating stem 13 has an inner end 28 which is threaded into the gate portion 21a. A removable lock screw 29 serves to lock the stem against rotation relative to the gate, and is accessible through one of the seat rings 17, as shown in FIGURE 1. Suitable means such as an O-ring 30 prevents leakage about the lock screw.

For the purpose of preventing leakage past the stem 13, there is shown a coupling bushing 31, which is attached to the reduced body portion 12 as by the threaded connection 32. A tube extension 33 is also attached to the bushing 31 by a threaded connection 34, and serves to mount suitable operating means. The means illustrated consists of a hand wheel 36 which is provided with an integral hub 37. This hub is internally threaded to engage the threaded portion 38 of the stem. Also it is carried by the bearing assembly 39, at the upper end of the tubular extension 33.

Figures 4, 5:
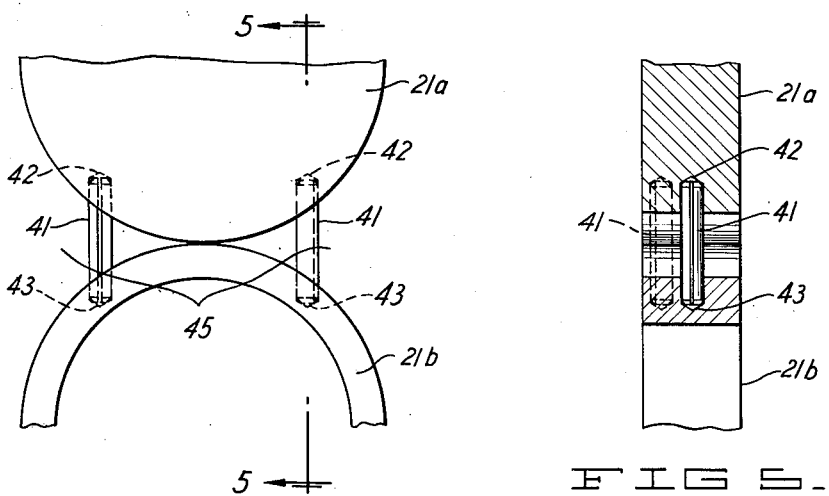
FIGURE 4 is a detail illustrating the attaching means between the gate portions.
FIGURE 5 is a detail in section taken along the line 5—5 of FIGURE 4.

The means for attaching the two portions of the gate, is shown particularly in FIGURES 4 and 5. This means consists of pins 41 which are parallel to each other, and parallel to the axis of the operating stem and to the center line of the gate. The end portions of these pins are fitted into the holes 42 formed in the gate portion 21a, and holes 43 are formed in the gate portion 21b. The pins are of the so-called spring type, being formed of spring steel or steel alloy, rolled upon itself, and provided with chamfered ends as indicated at 44. The normal outer diameter of each of the pins 41 is somewhat greater than the diameter of the openings 42 and 43. Therefore, the pins are sprung when they are forced into the holes, whereby a predetermined amount of force is required for their retraction. Taking both of the pins 41 into consideration, this retraction force is such that it is greatly in excess of the forces tending to pull the two portions apart during normal operation of the valve. The retractive force can be increased by providing the pins with knurled surfaces. One of the holes 42 may be in the center plane of the gate, and the other hole offset, as shown in FIGURE 5. This insures attachment of the parts without possibility of reversing portion 21b.

Figure 3:
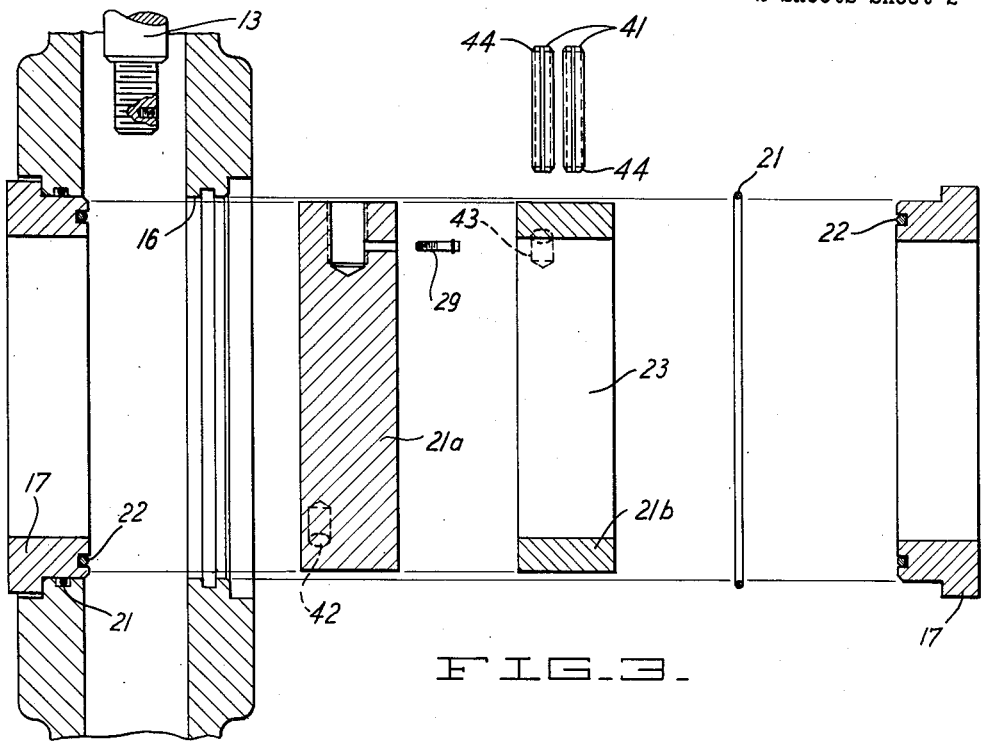
FIGURE 3 is an exploded view in section illustrating disassembly and assembly.

The manner in which the gate can be assembled or disassembled within the valve body can be made clear by reference to FIGURE 3. Assuming that it is desired to remove the gate, it can first be moved to nearly full open position, as, for example, about three-quarters of the movement required for full opening. Then rigid rods or the two branches of a fork are inserted through one or both of the spaces 45, and the valve stem turned to continue movement of the gate portion 21a to full open position. Since the inserted rods prevent movement of the gate portion 21b to full open position, the pins 41 are retracted from one or the other of the gate portions, thus separating the two gate portions for independent removal. Now (or before the operation just described) one or both of the seat rings 17 is removed from the body, after which the gate portion 21b is removed through one side of the body. Before this operation the pins, which may remain in certain of the holes, may be removed with pliers or other suitable tool. The screw 29 is now removed, after which the stem 13 is unscrewed from the gate portion 21a. The portion 21a is now free for removal through the side of the body. The parts of the gate can be assembled as follows: The gate portion 21a is first attached to the stem 13, after which the locking screw 29 is applied. After moving portion 21a to full open position, the pins 41 are inserted into portion 21a, and then the portion 21b is inserted and positioned with its openings 43 in alignment with pins 41. After inserting a bar through portion 21b, the gate portion 21a is moved towards closed position by operation of the valve stem, and as the portion 21a is being forced downwardly against the portion 21b, the pins 41 are forced into proper position. The inserted bar is then removed and the removed seal 17 is applied to complete the valve.

It will be evident that the attaching means described above for the two gate portions greatly facilitates assembly and disassembly operations, and provides an adequate attachment between the two gate portions which permits limited self-aligning action. Such devices as screws and nuts which require turning movements for their application or removal, are eliminated.

The valve described is of the rising stem type, with the stem fixed to the gate portion 21a. It will be evident that the invention can be applied to a non-rising stem, in which event the portion 21a is bored to accommodate a part of the stem, and carries a bushing having threaded engagement with the stem.

I claim:

1. In a gate valve, a valve body having aligned openings in its side walls, a gate comprising separate solid and ported portions, and means comprising spring type straight pins engaging in holes in both said portions and serving releasably to retain said portions together.

2. In a gate valve construction, a valve body having aligned openings in its side walls, a gate comprising separate solid and ported portions, gate operating means connected with said solid portion, said operating means including a rotatable valve stem, and a plurality of spring type straight pins engaging holes in both said portions and serving releasably to retain said portions together, said pins being disposed on axes parallel to the axis of said stem and to the centerline of the gate.

3. A gate valve construction as in claim 2 in which each of said portions is annular in configuration, and in which said pins are disposed on opposite sides of the centerline of said gate, with only end portions of said pins releasably fitted into aligned holes formed in the gate portions.

4. A valve construction as in claim 2 in which at least one of the openings in the valve body is of a diameter greater than the greatest dimension of each of said portions, whereby each of said portions can be assembled or disassembled through said opening.

References Cited in the file of this patent

UNITED STATES PATENTS 2,636,713     Hamer _____ Apr. 28, 1953

FOREIGN PATENTS 762,830     Great Britain _____ Dec. 5, 1956